United States Patent
Bogin et al.

(10) Patent No.: US 7,181,605 B2
(45) Date of Patent: Feb. 20, 2007

(54) DETERMINISTIC SHUT DOWN OF MEMORY DEVICES IN RESPONSE TO A SYSTEM WARM RESET

(75) Inventors: Zohar Bogin, Folsom, CA (US); Surya Kareenahalli, Folsom, CA (US); Anoop Mukker, Folsom, CA (US); David Sastry, Folsom, CA (US); Tuong Trieu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 10/693,226

(22) Filed: Oct. 24, 2003

(65) Prior Publication Data

US 2005/0091481 A1    Apr. 28, 2005

(51) Int. Cl.
*G06F 9/00*    (2006.01)
(52) U.S. Cl. .......................... 713/1; 710/267; 711/106; 714/799
(58) Field of Classification Search .................... 713/1; 714/799; 711/106; 710/267
See application file for complete search history.

(56) References Cited

U.S. PATENT DOCUMENTS

| 5,604,755 | A | * | 2/1997 | Bertin et al. ................. 714/799 |
| 5,758,170 | A | * | 5/1998 | Woodward et al. ......... 710/267 |
| 6,119,200 | A | * | 9/2000 | George ........................ 711/106 |
| 6,829,677 | B1 | * | 12/2004 | Attaway et al. ............. 711/106 |

* cited by examiner

*Primary Examiner*—Thomas Lee
*Assistant Examiner*—Sean Weinman
(74) *Attorney, Agent, or Firm*—Blakely, Sokoloff, Taylor & Zafman LLP

(57) ABSTRACT

A method to deterministically shut down memory devices in response to a system warm reset has been disclosed. One embodiment of the method includes causing a first type of reset in a number of memory devices in a system in response to a second type of reset in the system being initiated if the memory devices are not initialized and enabling a deterministic shutdown mode in a memory controller, which is coupled to the memory devices, after the memory devices have been initialized. Other embodiments are described and claimed.

28 Claims, 5 Drawing Sheets

DETERMINISTIC SHUT DOWN OF MEMORY DEVICES IN RESPONSE TO A SYSTEM WARM RESET

FIELD OF INVENTION

The present invention relates to computing technology, and more particularly, to deterministically shutting down memory devices in response to a system warm reset.

BACKGROUND

In general, there are two types of reset in a computer system, namely, a cold reset and a warm reset. To cold reset a computer system is to power down substantially all or all of the computer system and then to restart the computer system. In contrast, to warm reset the computer system is to restart the computer system, which is already turned on, via the operating system of the computer system. During the warm reset, the power in the computer system remains substantially stable. A user or a software application running on the computer system may initiate the warm reset.

Currently, many memory devices do not support an input control that permits an asynchronous logic reset to put the memory devices into a known initial logic state. To reach a known initial logic state for proper operation in the memory devices, a power cycling sequence is performed to initialize the memory devices. In other words, the memory devices go through a sequence of powering off and then on in order to be properly initialized to a known logic state, which is also referred to as a known state.

While running a power cycling sequence in the memory devices does not significantly impact the computer system when the computer system is powered up from a cold state, the power cycling sequence should not be run when the computer system is to be reset from a warm state because by definition a power cycling sequence is not a warm reset. As a result of no power cycling sequence when coming out of a warm reset, the memory devices will start with whatever state the memory devices were in previously before the warm reset. If the previous state is a known initial state, then the warm reset does not create a problem. However, if the previous state is an arbitrary unknown state, then the system cannot boot up because the memory devices are in the arbitrary unknown memory state after the warm reset.

In a prior art memory controller, also commonly referred to as a memory controller hub (MCH), the MCH is reset asynchronously in response to a system warm reset. The asynchronous reset of the MCH results in a non-deterministic timing relationship of interfacing signals (e.g., RAS#, CAS#, WE#, CKE controls, and CK/CKB clocks) between the MCH and the memory devices. This non-deterministic timing relationship may violate the setup and hold timing requirements of the interfacing signals relative to the clock signals of the memory devices. Furthermore, such a violation may cause the memory devices to enter into one or more arbitrary unknown states. To recover from the unknown states, the memory devices have to go through a power cycling sequence after the asynchronous reset.

However, it is problematic to force the memory devices to go through a power cycling sequence as this action by definition is a cold reset, as opposed to the intended warm reset.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

DETAILED DESCRIPTION

In the following description, numerous specific details are set forth. However, it is understood that some embodiments may be practiced without these specific details. In other instances, well-known circuits, structures, and techniques have not been shown in detail in order not to obscure the understanding of this description. Furthermore, references to "one embodiment" in the following description may or may not be directed to the same embodiment.

Figure 1:
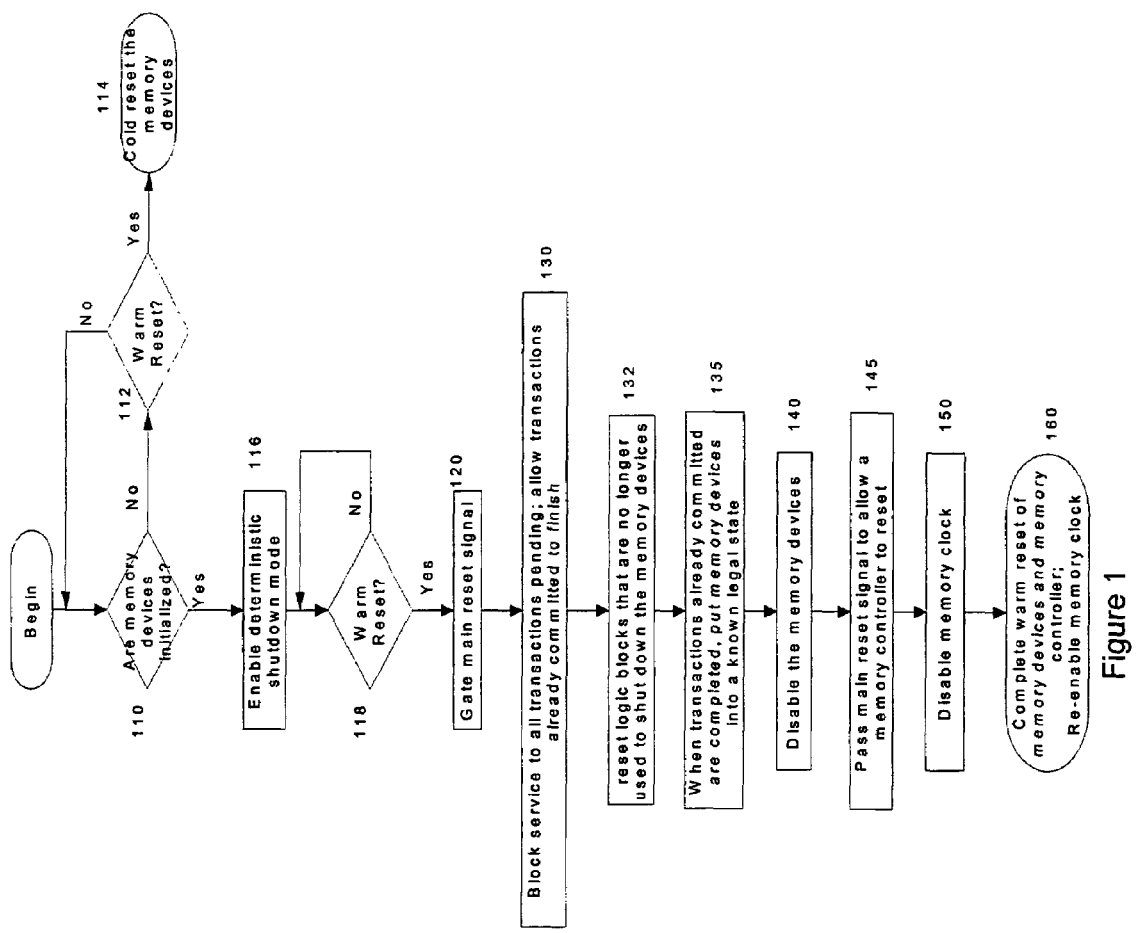
FIG. 1 shows a flow diagram of one embodiment of a process to deterministically shut down memory devices.

FIG. 1 shows a flow diagram of one embodiment of a process to shut down memory devices in a system in response to a warm reset in the system. The process is performed by processing logic that may comprise hardware (e.g., circuitry, dedicated logic, etc.), software (such as is run on a general purpose computer system or a dedicated machine), or a combination of both. Referring to FIG. 1, processing logic checks whether the memory devices have been initialized (processing block 110). In one embodiment, processing logic reads a memory initialization register bit, which is not affected by the warm reset. In one embodiment, the bit is set to "1" when the memory devices are not initialized and "0" when the memory devices are initialized. If the memory devices have not been initialized, processing logic checks whether there is a warm reset in the system (processing block 112). The warm reset in the system may also be referred to as a main reset or a system main reset. If there is a warm reset in the system, processing logic forces a cold reset in the memory devices (processing block 114). In one embodiment, processing logic causes the power supplies to the memory devices to be turned off and on, thus subjecting the memory devices through a power cycling sequence in order to put the memory devices into a known logic state. If there is no warm reset in the system, processing logic checks whether the memory devices have been initialized again by repeating the processing block 110.

When the memory devices have been initialized, processing logic enables a deterministic shutdown mode (processing block 116). In one embodiment, processing logic further updates the memory initialization register bit to indicate that the memory devices have been initialized. While in the deterministic shutdown mode, processing logic checks whether there is a warm reset in the system (processing block 118). If there is no warm reset in the system, processing logic continues monitoring for a warm reset in the system. Otherwise, processing logic gates a main reset signal indicating a warm reset in the system (processing block 120). Gating the main reset signal prevents the memory controller from being forced into a reset, which may result in an indeterminate relationship of command interfacing signals to the memory devices causing the memory devices to enter into an arbitrary unknown state not recoverable unless the memory devices go through a power cycling sequence.

To avoid putting the memory devices into an arbitrary unknown state, processing logic performs a series of operations to ensure the memory devices are put into a known state. The known state is a state in which the clocks of the memory devices are disabled such that the memory devices are insensitive to other input control signals provided to the memory devices. The memory devices can recover correctly from the known state without powering down. An example of the known state is a self-refresh state. In one embodiment, processing logic prevents pending transactions in one or more memory request queues from being serviced while allowing transactions already committed to finish before the memory devices have entered into the known state (processing block 130). Processing logic may signal a memory request arbiter in a memory controller to block service to the pending transactions. Furthermore, processing logic may reset one or more logic blocks that are no longer used to put the memory devices into a known state before the memory devices have entered into the known state (processing block 132).

When the committed transactions are finished, processing logic puts the memory devices into a known state (processing block 135). When the memory devices are in a known state, processing logic disables the memory devices (processing block 140). Processing logic then passes the main reset signal to allow a memory controller to reset (processing block 145). After resetting the memory controller, processing logic may disable a memory clock (processing logic 150). Then processing logic completes the warm reset of the memory controller (processing block 160). Processing logic re-enables the memory clock after completing the warm reset.

Figure 2:
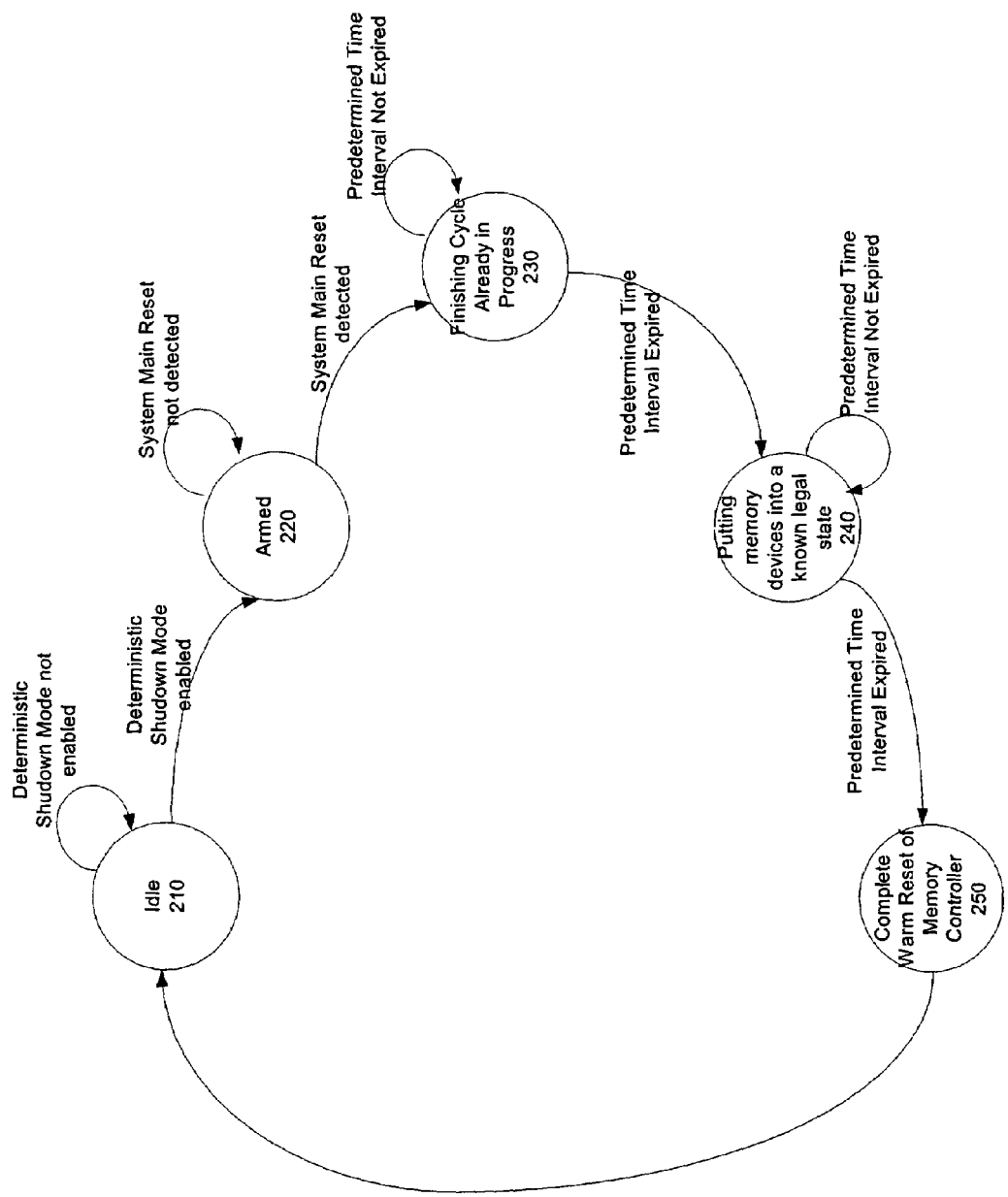
FIG. 2 shows a state diagram of one embodiment of a state machine of a memory controller.

The operations described above to shut down memory devices in response to a system warm reset may be implemented using, for instance, a state machine in a memory controller and a software routine. Furthermore, the state machine may be implemented with application-specific circuitry, general-purpose circuitry, or a combination of both. FIG. 2 shows a state diagram of one embodiment of a state machine of a memory controller. Initially, the state machine is in an idle state 210 before the memory devices have been initialized. The state machine remains in the idle state 210 as a deterministic shutdown mode has not been enabled. If a system main reset, also known as a warm reset, is detected while the state machine is in the idle state 210, the state machine may pass a signal indicating the warm reset. Since the memory devices have not yet been initialized, the memory devices cannot respond to commands such as entering self-refresh. Hence, the memory devices are forced into a cold reset in response to the warm reset being initiated in the system.

Upon the computer system restart after the warm reset, the software may then cause the memory devices to go into a cold reset by running a power supply cycling sequence. In one embodiment, a basic input/output system (BIOS) program causes the power supplies to the memory devices to be turned off and on, thus subjecting the memory devices through a power cycling sequence to put the memory devices into the cold reset.

After the memory devices have been initialized, the deterministic shutdown mode is enabled to allow true handling of the warm reset. When the deterministic shutdown mode is enabled, the state machine goes into an armed state 220. During the armed state 220, the signal indicating that the system main reset has started is gated from the memory controller and the memory devices such that selective logic blocks of the memory controller may not respond to the signal initially. For example, logic components of the memory controller that are associated with the state machine, such as counters, timers, and flags, are gated from the main system reset. The state machine remains in the armed state 220 until the main system reset is detected by monitoring the signal.

In response to the signal, the state machine goes into the state 230. The finishing cycle of the memory controller is in progress during the state 230. In one embodiment, pending transactions in a queue of memory transactions are blocked from the memory devices when the state machine is in the state 230. A transaction already committed to by the memory controller may be allowed to finish within a predetermined time interval. In one embodiment, the time interval for finishing committed transactions is predetermined and the state machine uses a programmable counter to time the interval. Alternatively, logic blocks performing the committed transactions may send signals to the state machine to inform the state machine of the completion of the committed transactions. Moreover, selective logic components of the memory controller may be reset at various stages during this time interval if the respective logic components are no longer used to complete the reset of the memory devices. The resetting of selective logic components during this time interval is also referred to as a staged reset of the memory controller.

When the committed transactions have been completed, the state machine goes into the state 240 to signal the memory controller to put the memory devices into a known state, for instance, a self-refresh state. Again, selective logic components of the memory controller may be reset at various stages during this time interval when the respective logic components are no longer used to complete the shut down of the memory devices. The resetting of selective logic components during this time interval is also referred to as a staged reset of the memory controller.

Furthermore, the state machine may cause the memory controller to de-assert a clock enable signal in order to disable a memory clock during the state 240. The state machine may wait a predetermined period of time interval for the memory devices to enter into the known state. In one embodiment, the state machine uses a programmable counter to time the interval. When the time interval has elapsed, the memory devices have entered the known state. Alternatively, the state machine may monitor the memory devices to determine whether the memory devices have entered the known state.

After the memory devices have gone into the known state, the state machine may go into the state 250 to complete the warm reset of the memory controller. In one embodiment, the state machine passes the gated main reset signal to cause the memory controller to completely reset. When the state machine and the associated logic blocks in the memory controller have been asynchronously reset, the state machine returns to the initial idle state 210.

Figure 3:
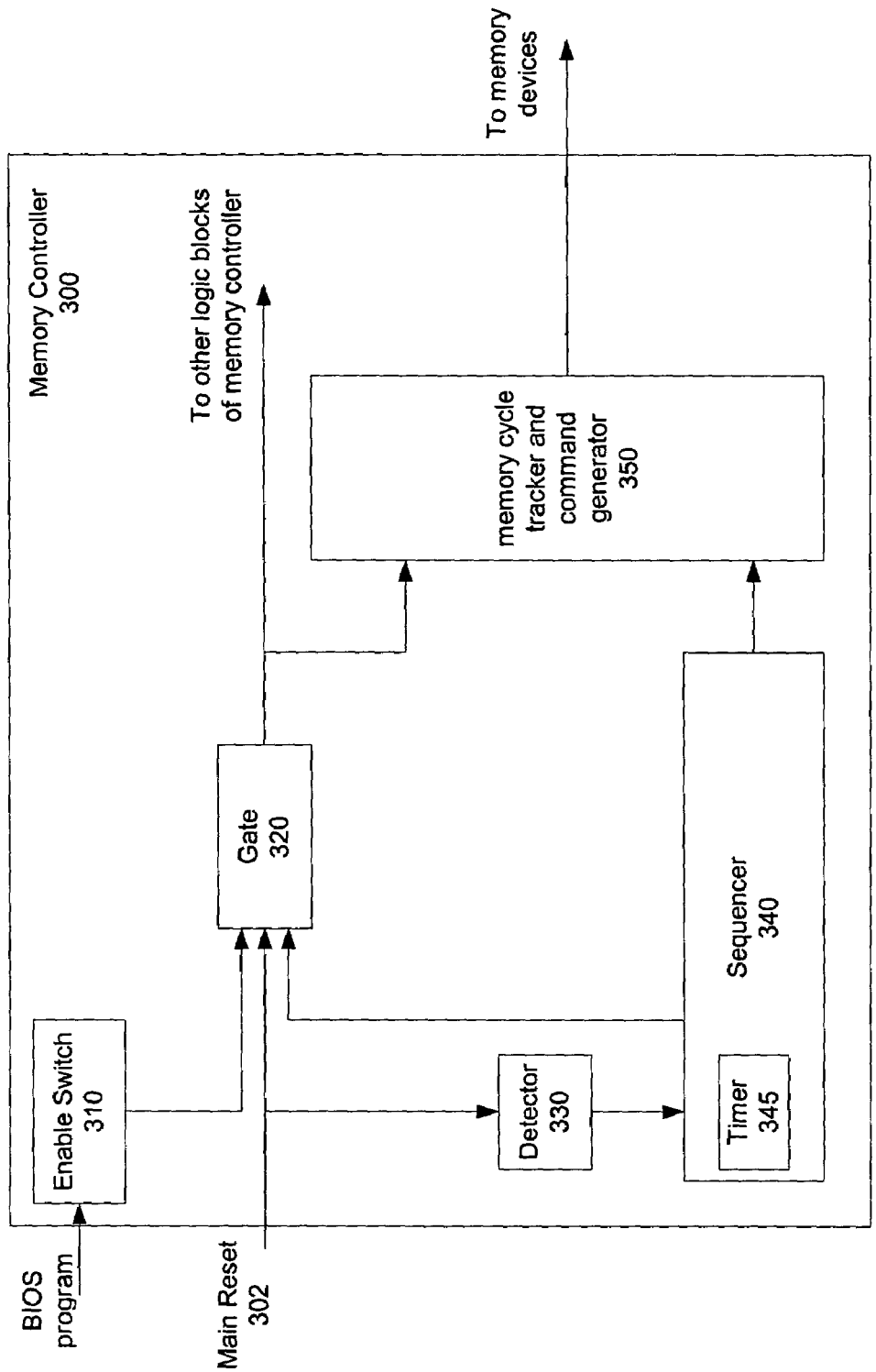
FIG. 3 shows one embodiment of a memory controller.

FIG. 3 shows one embodiment of a memory controller for controlling memory devices in a system. The memory controller includes an enable switch 310, a gate 320, a detector 330, a sequencer 340, and a memory cycle tracker and command generator 350. Referring to FIG. 3, the enable switch 310 enables a deterministic shutdown mode in response to an input or a signal from a basic input/output system (BIOS) program. In one embodiment, the BIOS program activates the enable switch 310 to enable the deterministic shutdown mode once the memory devices have been initialized. The enable switch 310 outputs a signal to the gate 320.

Furthermore, the gate 320 receives a main reset signal 302 from the system, which indicates whether there is a system warm reset. The main reset signal 302 is also input to the detector 330. The detector provides an output to the sequencer 340. The sequencer 340 outputs signals to the gate 320 and the memory cycle tracker and command generator 350. The memory cycle tracker and command generator 350 also receives the output from the gate 320. The output of the memory cycle tracker and command generator 350 drives the memory devices in response to the signals from the sequencer 340 and/or the gate 320.

When the memory devices are not initialized yet, the enable switch 310 disables the deterministic shutdown mode to allow the gate 320 to pass the main reset signal 302 to the memory cycle tracker and command generator 350 as well as other logic blocks of the memory controller 300. If the main reset signal 302 indicates that a warm reset occurs in the system, the gate 320 passes the main reset signal 302 to cause the memory controller 300 to reset and to allow the BIOS program upon a system restart to force a cold reset in the memory devices. In one embodiment, the cold reset includes power cycling the memory devices.

When the memory devices have been initialized, the enable switch 310 enables the deterministic shutdown mode to cause the gate 320 to block the main reset signal 302 from the memory cycle tracker and command generator 350 and other logic blocks of the memory controller 300. When there is a warm reset, the main reset signal 302 is asserted. In response to the asserted main reset signal 302, the detector 330 sends an output to the sequencer 340 to cause the sequencer 340 to go through a sequence of operations to put the memory devices into a known state.

In one embodiment, the sequencer 340 prevents pending transactions in a memory queue from being serviced while allowing committed transactions to be finished. The sequencer 340 may use a timer 345 to wait a predetermined period of time such that the committed transactions are finished by the end of the period. When the committed transactions are finished, the sequencer 340 sends signals to the memory cycle tracker and command generator 350 to cause the memory cycle tracker and command generator 350 to put the memory devices into a known state, such as, for example, a self-refresh state.

After the memory devices have entered the known state, the sequencer 340 signals the gate 320 to pass the main reset signal 302 to other logic blocks of the memory controller 300. In response to the main reset signal, all logic blocks of the memory controller 300 may reset, i.e., the memory controller 300 may completely reset.

Figure 4:
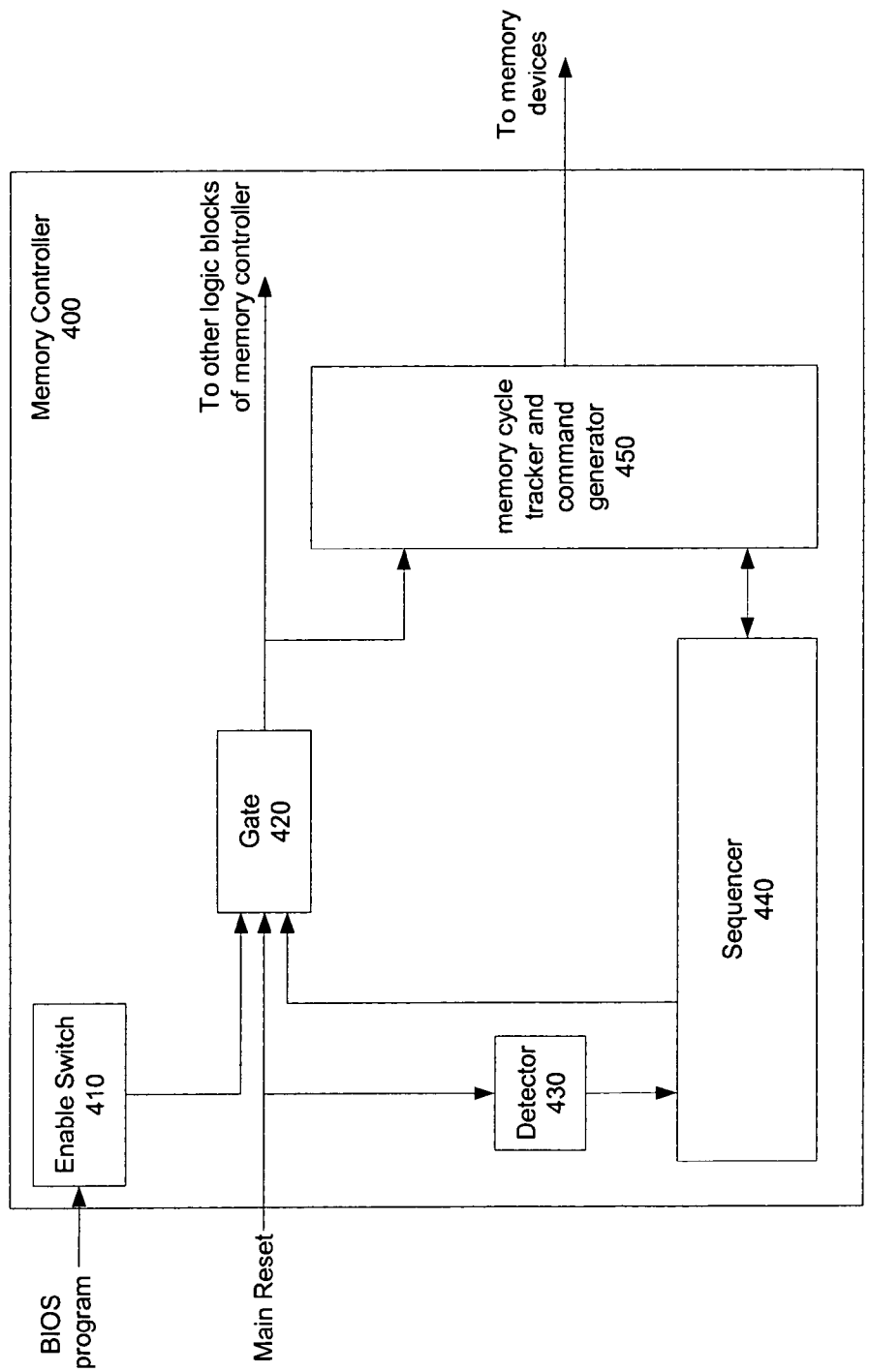
FIG. 4 shows another embodiment of a memory controller.

FIG. 4 shows an alternate embodiment of the memory controller. The memory controller 400 includes an enable switch 410, a gate 420, a detector 430, a sequencer 440, and a memory cycle tracker and command generator 450. The enable switch 410, the gate 420, and the detector 430 function in a substantially similar way as the corresponding components shown in FIG. 3. However, unlike the sequencer 340, which uses the timer 345 to wait a predetermined time interval for the committed transactions to be finished (referring to FIG. 3), the sequencer 440 receives one or more signals from the memory cycle tracker and command generator 450 to determine whether committed memory transactions have been completed. Furthermore, the sequencer 440 may receive one or more signals from the memory cycle tracker and command generator 450 to determine whether the memory devices have entered into a known state instead of using a timer to wait a predetermined period of time.

Figure 5:
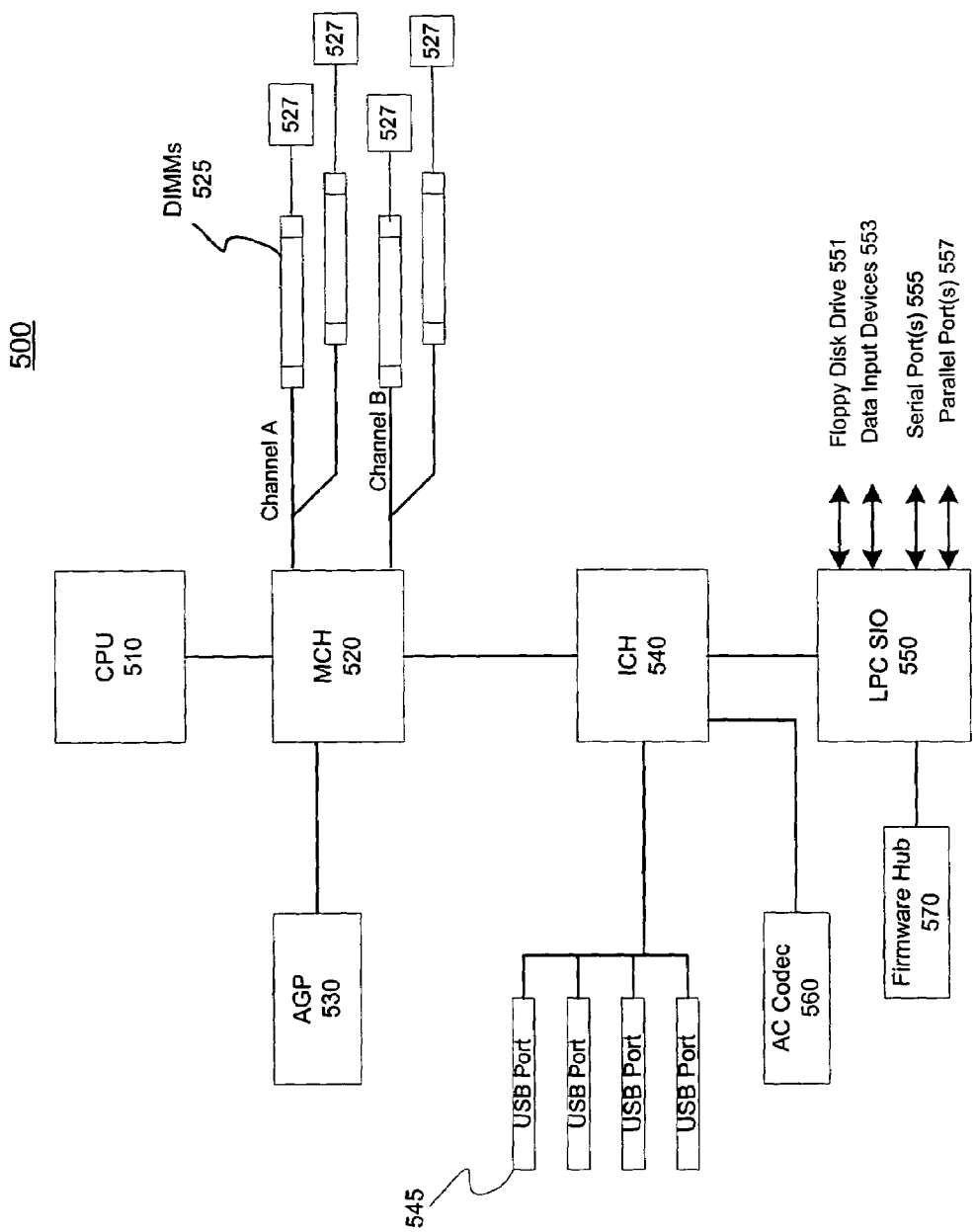
FIG. 5 shows an exemplary embodiment of a computer system.

FIG. 5 shows an exemplary embodiment of a computer system. The computer system 500 includes a central processing unit (CPU) 510, a memory controller (MCH) 520, a number of dual in-line memory modules (DIMMs) 525, a number of memory devices 527, an advance graphics port (AGP) 530, an input/output controller (ICH) 540, a number of Universal Serial Bus (USB) ports 545, an audio converter co-decoder (AC Codec) 560, a switch 550, and a firmware hub 570.

In one embodiment, the CPU 510, the AGP 530, the DIMMS 525, and the ICH 540 are coupled to the MCH 520. The MCH 520 routes data to and from the DDR SDRAM devices 527 via the DIMMs 525. The memory devices may include various types of memories, such as, for example, dynamic random access memory (DRAM), synchronous dynamic random access memory (SDRAM), double-data rate (DDR) SDRAM, or flash memory. In one embodiment, each of the DIMMs 525 is mounted on the same motherboard (not shown) via a DIMM connector (not shown) in order to be coupled to the MCH 520. In one embodiment, the USB ports 545, the AC Codec 560, and the switch 550 are coupled to the ICH 540. The switch 550 may be further coupled to a firmware hub 570, a floppy disk drive 551, data input devices 553, such as, a keyboard, a mouse, etc., a number of serial ports 555, and a number of parallel ports 557.

Note that any or all of the components and the associated hardware illustrated in FIG. 5 may be used in various embodiments of the computer system. However, it should be appreciated that other configuration of the computer system may include some or all of the devices shown in FIG. 5. Furthermore, some embodiments of the computer system may include additional components not shown in FIG. 5.

In one embodiment, the MCH 520 supports a deterministic shutdown mode. The MCH 520 may determine whether the memory devices 527 have been initialized by reading a memory initialization register bit, which may not be affected by the warm reset. The bit may be stored in the ICH 540. The bit may be set to "1" when the memory devices 527 are not initialized and "0" otherwise. Before the memory devices 527 have been initialized, the MCH 520 and the supporting BIOS program causes a cold reset in the memory devices 527 if a warm reset occurs in the system 500. In one embodiment, the BIOS program triggers a power cycling sequence by sending a command to the ICH 540 to cause the ICH 540 to turn off and on the power supply to the memory devices 527 in order to cause a cold reset in the memory devices 527. After the memory devices 527 have been initialized, the MCH 520 enables the deterministic shutdown mode.

While in the deterministic shutdown mode, the MCH 520 gates a main system reset signal that indicates a warm reset. In response to the warm reset, the MCH 520 puts the memory devices 527 into a known state, such as a self-refresh state, such that the memory devices 527 can be recovered after the warm reset without going through a power cycling sequence. While the MCH 520 is putting the memory devices 527 into the known state, various logic blocks in the MCH 520 that are no longer used to complete putting the memory devices 527 into the known state may be reset in various stages. This is also referred to as a staged reset of the MCH 520. After the memory devices 527 have been put into the known state, the main system reset signal is passed to all logic blocks of the MCH 520 to reset the MCH 520.

Moreover, one should appreciate that the above technique is applicable to various types of memory devices (e.g., DRAM, SDRAM, DDR SDRAM), as well as different types of system environment, such as a multi-drop environment or a point-to-point environment.

The foregoing discussion merely describes some exemplary embodiments of the present invention. One skilled in the art will readily recognize from such discussion, the accompanying drawings and the claims that various modifications can be made without departing from the spirit and scope of the appended claims. The description is thus to be regarded as illustrative instead of limiting.

What is claimed is:

1. A method comprising:
   causing a first type of reset in a plurality of memory devices in a system in response to a second type of reset being initiated in the system if the plurality of memory devices are not initialized, where the second type of reset is different than the first type of reset; and
   enabling a deterministic shutdown mode in a memory controller coupled to the plurality of memory devices after the plurality of memory devices have been initialized.

2. The method of claim 1, further comprising:
   putting the plurality of memory devices into a known state in response to the second type of reset being initiated in the system if the deterministic shutdown mode is enabled.

3. The method of claim 2, further comprising resetting in a plurality of stages a plurality of logic blocks in the memory controller while putting the plurality of memory devices into the known state.

4. The method of claim 3, further comprising resetting the memory controller after the plurality of memory devices have been put into the known state.

5. The method of claim 2, wherein the known state is a self-refresh state.

6. The method of claim 1, wherein the plurality of memory devices comprises one or more double data rate synchronous dynamic random access memory devices (DDR SDRAM).

7. The method of claim 1, wherein the first type of reset is a cold reset and the second type of reset is a warm reset.

8. An apparatus in a system comprising:
   a switch to enable a deterministic shutdown mode when a plurality of memory devices in the system have been initialized;
   a detector to detect a reset signal; and
   a gate to gate the reset signal if the deterministic shutdown mode is enabled and to pass the reset signal to a logic unit if the deterministic shutdown mode is not enabled, wherein the plurality of memory devices go through a first type of reset in response to a second type of reset being initiated in the system if the deterministic shutdown mode is not enabled, and the reset signal indicates that the second type of reset is being initiated in the system, where the second type of reset is different than the first type of reset.

9. The apparatus of claim 8, further comprising:
   a sequencer, coupled to the detector, to cause the logic unit to put the plurality of memory devices into a known state in response to the second type of reset being initiated if the deterministic shutdown mode is enabled.

10. The apparatus of claim 9, wherein the sequencer causes the gate to pass the reset signal after the plurality of memory devices have been put into the known state.

11. The apparatus of claim 9, wherein the logic unit comprises a memory cycle tracker and command generator.

12. The apparatus of claim 11, wherein the sequencer receives one or more signals from the memory cycle tracker and command generator to determine whether the plurality of memory devices have been put into the known state.

13. The apparatus of claim 9, wherein the known state is a self-refresh state.

14. The apparatus of claim 9, further comprising a plurality of logic blocks, which are not used to put the plurality of memory devices into the known state and are reset in response to the second type of reset being initiated while the plurality of memory devices are being put into the known state.

15. The apparatus of claim 8, wherein the plurality of memory devices includes one or more double data rate synchronous dynamic random access memory devices (DDR SDRAM).

16. The apparatus of claim 8, wherein the first type of reset is a cold reset and second type of reset is a warm reset.

17. A computer system comprising:
   a plurality of synchronous dynamic random access memory devices (SDRAM); and
   a memory controller, coupled to the plurality of SDRAMs, comprising a switch to enable a deterministic shutdown mode when the plurality of SDRAMs have been initialized;
   a detector to detect a reset signal; and
   a gate to gate the reset signal if the deterministic shutdown mode is enabled and to pass the reset signal to a logic unit if the deterministic shutdown mode is not enabled, wherein the plurality of SDRAMs go through a first type of reset in response to a second type of reset being initiated if the deterministic shutdown mode is not enabled, and the reset signal indicates that the second type of reset is being initiated, where the second type of reset is different than the first type of reset.

18. The computer system of claim 17, wherein the memory controller further comprises:
   a sequencer, coupled to the detector, to cause the logic unit to put the plurality of SDRAMs into a known state in response to the second type of reset being initiated if the deterministic shutdown mode is enabled.

19. The computer system of claim 18, wherein the sequencer causes the gate to pass the reset signal after the plurality of SDRAMs have been put into the known state.

20. The computer system of claim 18, wherein the logic unit comprises a memory cycle tracker and command generator.

21. The computer system of claim 20, wherein the sequencer receives one or more signals from the memory cycle tracker and command generator to determine whether the plurality of SDRAMs have been put into the known state.

22. The computer system of claim 18, wherein the known state is a self-refresh state.

23. The computer system of claim 18, wherein the memory controller further comprises a plurality of logic blocks, which are not used to put the plurality of SDRAMs into the known state and are reset in response to the second type of reset being initiated while the plurality of SDRAMs are being put into the known state.

24. The computer system of claim 17, wherein the plurality of SDRAMs comprises one or more double data rate (DDR) SDRAMs.

25. The computer system of claim 17, wherein the first type of reset is a cold reset and the second type of reset is a warm reset.

26. The computer system of claim 17, further comprising a processor coupled to the memory controller.

27. The computer system of claim 26, wherein the processor initiates the second type of reset in response to a user request or a software application.

28. The computer system of claim 17, further comprising an input/output controller, coupled to the memory controller, to store a bit to indicate whether the plurality of SDRAMs are initialized.

* * * * *